Nov. 29, 1966 C. A. WALTON ET AL 3,289,168

INTERRUPT CONTROL SYSTEM

Filed July 31, 1962 3 Sheets-Sheet 1

INVENTORS.
CHARLES A. WALTON
RICHARD W. BENNETT

BY Carl W. Laumann, Jr.

ATTORNEY

Nov. 29, 1966 C. A. WALTON ETAL 3,289,168

INTERRUPT CONTROL SYSTEM

Filed July 31, 1962 3 Sheets-Sheet 2

Nov. 29, 1966 C. A. WALTON ETAL 3,289,168

INTERRUPT CONTROL SYSTEM

Filed July 31, 1962 3 Sheets-Sheet 3

United States Patent Office 3,289,168
Patented Nov. 29, 1966

3,289,168
INTERRUPT CONTROL SYSTEM
Charles A. Walton, Los Gatos, Calif., and Richard W. Bennett, Yorktown Heights, N.Y., assignors to International Business Machines Corporation, New York, N.Y., a corporation of New York
Filed July 31, 1962, Ser. No. 213,772
3 Claims. (Cl. 340—172.5)

Figure 1:
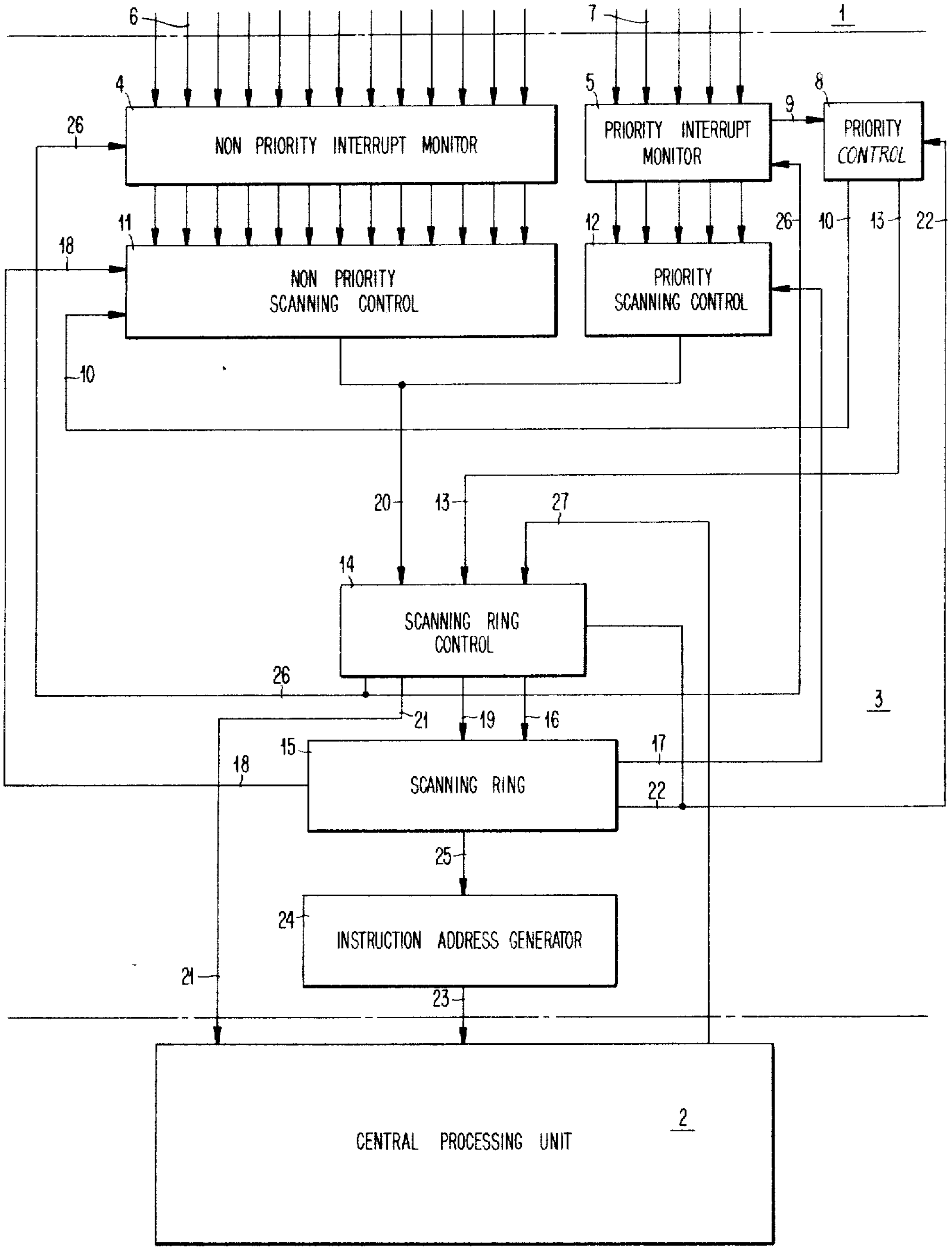

This invention relates generally to systems for interrupting the internally stored program of a computer in response to a random external event, and in particular to the means for detecting and identifying the interrupting event.

The desirability of interrupting a computer program by an external event exists in a large number of computer applications. For example, in a data processing installation the central processing unit generally operates at much higher speeds than the associated input-output equipment. A great deal of time may be saved by using the central processing unit only to initiate and terminate operations with the input-output equipment. When a device such as a tape drive requires computer attention, it interrupts the computer for execution of the several instructions which are required to place the tape drive in operation. After this has been done, the computer returns to other work, returning to the tape drive unit only when further attention is required. Another savings in time is realized for the output function. For example, a computer may be called upon to print data by means of an electric typewriter. To tie up the central processing unit while the relatively slow typewriter is mechanically printing the data presented to it would be extremely wasteful of processing time. The central processing unit sends a single character to the typewriter and returns to other instructions in a second or other program. When the typewriter indicates that printing of the single character is complete, the central processing unit sends another character to the typewriter, diverting from the mainline program only when required, and then only for as short a period as it takes to develop the single character and present it to the typewriter.

All of these interrupt situations are significant, but perhaps the most important of all is the truly random generation of interrupts in response to events occurring in a process under control of the computer. It can be readily appreciated that the development of a critical pressure, temperature, or the like, must be recognized immediately and corrective action begun without delay if a successful, safe operation of a process is to be achieved.

The known techniques for detection and identification of interrupt conditions used to control peripheral equipment in a data processing unit are adequate where small numbers of interrupt conditions occur. These are generally unsatisfactory where large numbers of random interrupts must be handled. In a process control application it is likely that fifty or more conditions will be monitored, each one of which must be capable of interrupting the computer program and initiating a corrective action peculiar to the particular interrupt condition. Extension of the conventional interrupt recognition techniques to this application involves a great deal of hardware, which in turn reduces the system reliability and raises the cost.

To provide an improved system for detecting and identifying large numbers of interrupt conditions, a high speed scanning ring is utilized which continuously monitors all the interrupt lines in sequence. The ring steps periodically until it encounters an interrupt line which is activated. At this point the ring is stopped and held at the position indicating an interrupt. A signal is then sent to the central processing unit indicating that an interrupt request exists. The central processing unit diverts from its normal sequence of instructions and responds to an artificial instruction or storage address of an instruction based on the status of the interrupt ring. Thus, the interrupt ring serves both to detect an interrupt condition and provide the basis for storage address indicating the particular interrupt line which is activated.

Another important aspect of the detection and identification system is that it must be able to handle the situation in which two interrupt conditions occur simultaneously. The system must avoid the loss of an interrupt signal and at the same time insure that the correct signal is selected.

It is an object of this invention to provide an improved interrupt control system.

It is another object of this invention to provide an improved interrupt detection and identification system.

Another object of this invention is to provide scanning means for detecting and identifying an interrupt condition.

Still another object of this invention is to provide means for locating an interrupt condition and generating a storage address for a central processing unit responsive to the interrupt condition.

The foregoing and other objects, features and advantages of the invention will be apparent from the following more particular description of preferred embodiments of the invention, as illustrated in the accompanying drawings.

FIG. 1 is a functional block diagram of a computer system utilizing my invention.

Figure 2A:
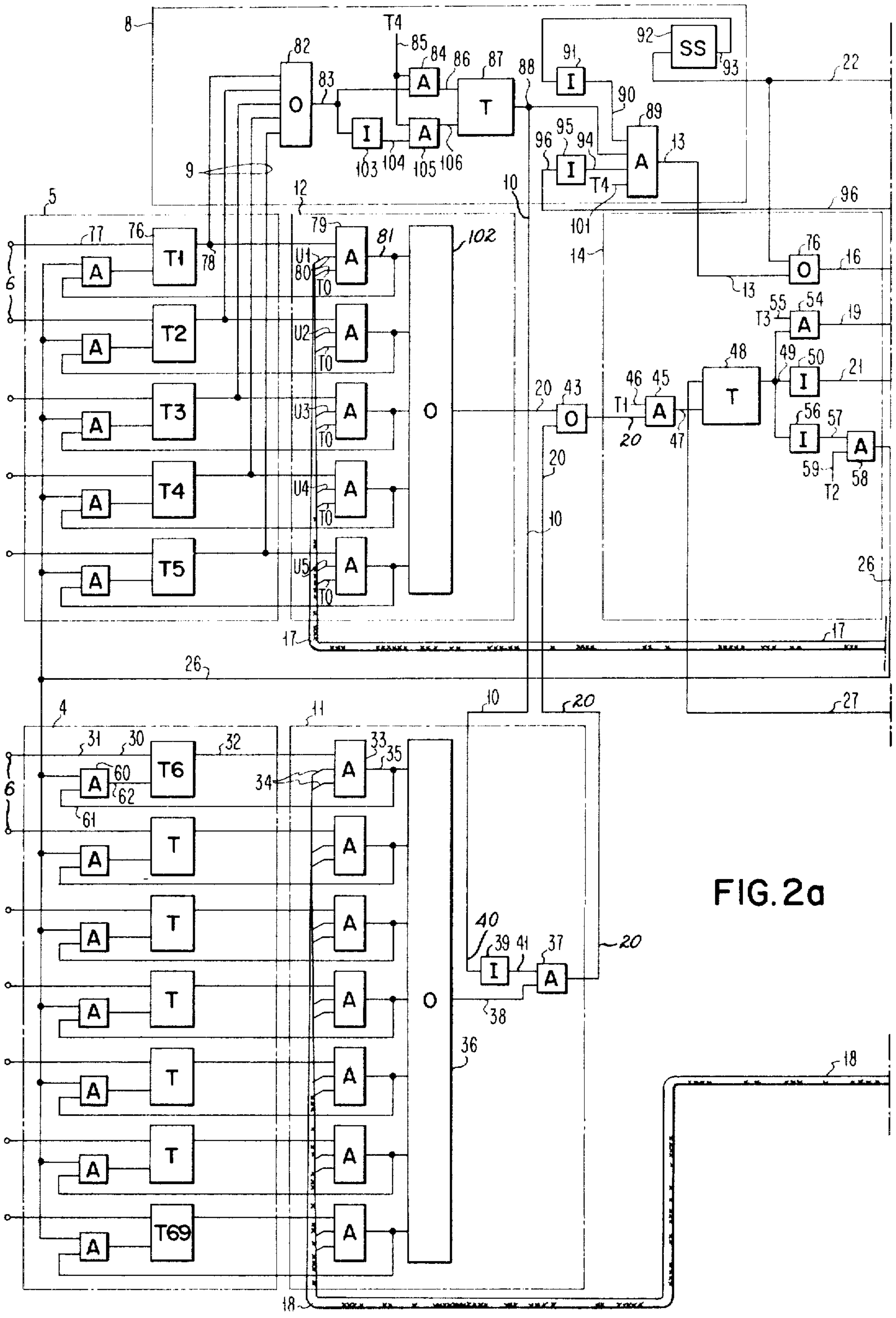
Figures 2B, 3:
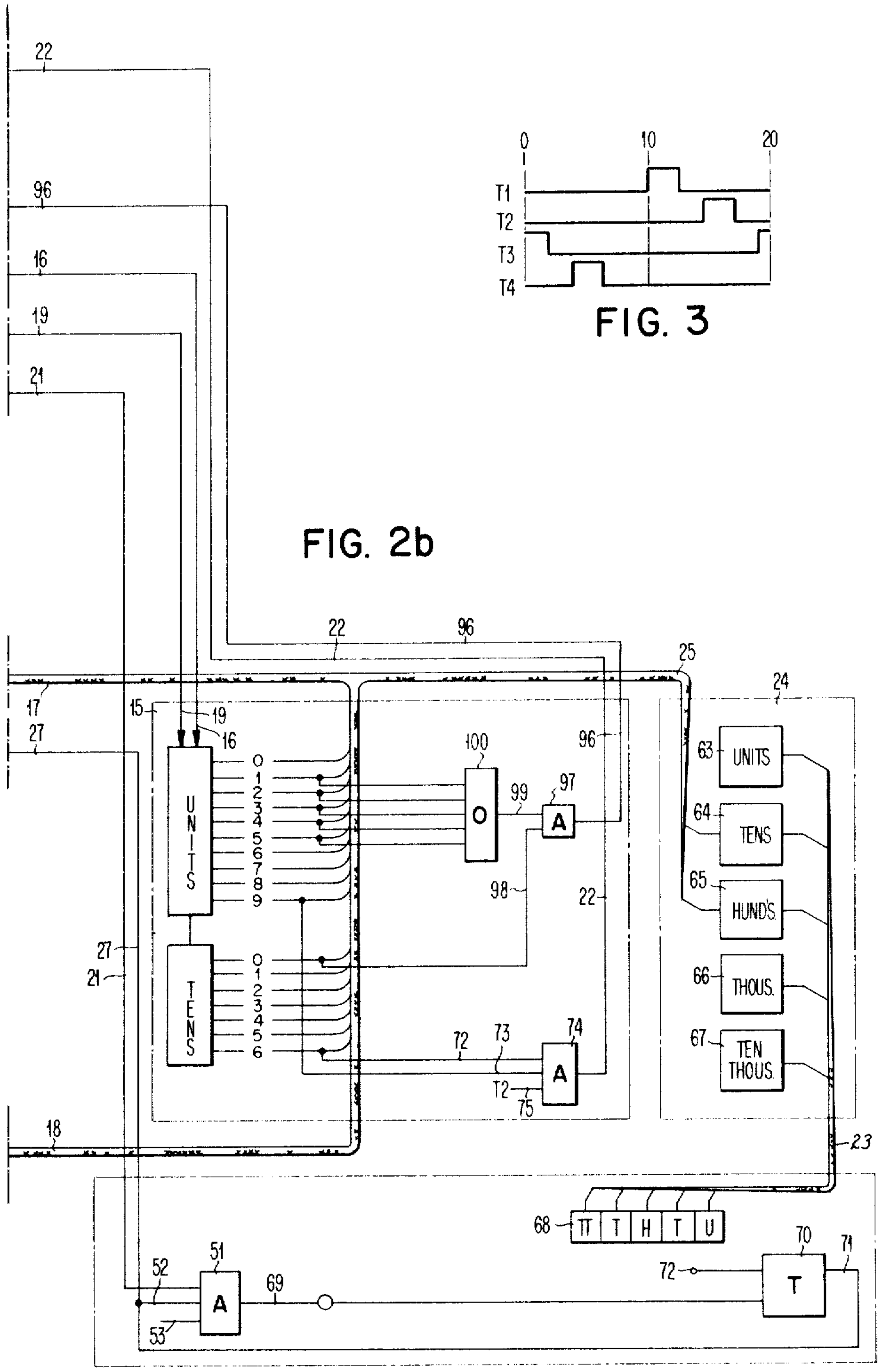

FIGURES 2*a* and 2*b* are logical diagrams showing the arrangement of the control circuits for interrupt scan, interrupt priority, interrupt request and mask interrupt.

FIG. 3 is a timing diagram for the interrupt control system.

The block diagram of FIG. 1 represents the preferred embodiment in simplified form. The combination shown includes three basic elements: first, there is the process 1 or other operation which is to be monitored; second, the computer 2 referred to as the central processing unit (CPU); the interrupt control system 3 lies between the CPU2 and the process 1.

The non-priority interrupt monitor 4 and the priority interrupt monitor 5 are responsive to signals on the plurality of interrupt lines 6 and 7, respectively.

When a condition in process 1, being monitored by one of the interrupt lines 6 and 7, is such that normal operation of CPU2 should be altered, a signal is applied on the particular line to the associated interrupt monitor.

The monitors 4 and 5 provide a lasting indication of the process signal, which may be transient in nature. For example, the process interrupt signal could be a brief closing of a switch or a pulse from a measuring or timing device. These signals must be preserved until CPU2 has had an opportunity to service the associated interrupt line.

The priority interrupt monitor 5 indicates the existence of an interrupt signal which is to be given special significance. Such signals might be derived from extremely critical points of the process or timing signals used to initiate special routines of CPU2. In the event that a signal appears on one or more of priority interrupt lines 7, the priority control 8 receives a signal on line 9 which indicates that special action beyond the normal interrupt is required.

The output of priority control 8 on line 10 is applied to the non-priority scaning control 11. This has the effect of allowing suppression of the output of non-priority scanning control 11 in favor of priority scanning control 12. Another output 13 of priority control 8 is applied to scanning ring control 14. This has the effect of initiating special action of the scanning ring 15 by means of a signal on line 16. In general, this special action consists of a reset and scan of only the priority interrupt monitor 5. After a reset signal the scanning ring 15 proceeds to sequentially interrogate, by means of line 17, the priority lines coming from priority interrupt monitor 5. If the interrupt had not been one of priority, the scan would continue and extend to non-priority interrupt monitor 4 by means of line 18.

When a monitor is found indicating an interrupt signal, the scanning ring 15 is halted by a signal on line 19 developed from scanning ring control 14 in response to a signal on line 20. Scanning ring control 14 then develops an interrupt request signal on line 21 to CPU2. At a time compatible with the internal timing of CPU2, the main line program is interrupted and a special interrupt routine is begun.

Since the interrupt of subroutine of CPU2 will differ depending on the particular interrupt condition which caused it, some means of identifying the interrupt line must be provided. Each subroutine consists of a series of instructions located in storage associated with CPU2. In addition to identifying the interrupt line, the CPU2 must determine the location of the first instruction of the appropriate subroutine.

These two essential operations are performed by scanning ring 15. To begin with, the scanning ring 15 is held at the position indicating an interrupt signal by means of the scanning ring control 14. This is accomplished by withholding the stepping pulses normally applied to line 19. When the scanning ring 15, by means of line 17 to the priority scanning control 12 and line 18 to the non-priority scanning control 11 encounters an interrupt monitor within 4 or 5 which shows an interrupt signal, an output signal appears on line 20. This signal is applied to scanning ring control 14 which in turn provides the previously mentioned signal on line 21 to request an interrupt from the CPU2. The scanning ring control 14 then stops the scanning ring 15 at the position indicating the interrupt line which is requesting service by inhibiting the timing pulses fed to line 19. Line 22 runs from scanning ring 15 to priority control 8 to perform a reset function which is explained later. It is sufficient to state that line 22 resets a 1.5 second timer each time the last ring position is reached. The priority condition is blocked unless the scanning ring completes a scan of all interrupt lines within the 1.5 second period.

The CPU2 is connected to read the position of the scanning ring 15 through line 23, instruction address generator 24 and line 25 just as it would read any other input device such as a card reader or paper tape reader. This value is then used as a storage address which represents the location of the first instruction of the subroutine. The resulting address is placed in the appropriate register within CPU2 and execution of the subroutine is begun.

At the conclusion of the subroutine, CPU 2 provides a signal on line 27 which causes scaning ring control 14 to again begin operation of scanning ring 15.

Line 26 leading from the scanning ring control 14 to non-priority interrupt monitor 4 and priority interrupt monitor 5 performs a reset function which turns off the monitor being serviced. The manner in which this is accomplished is described in more detail with reference to FIG. 2.

Having described the system in general terms with reference to FIG. 1, the detailed explanation of the preferred embodiment of this invention will be made with reference to FIGS. 2*a* and 2*b*. Portions of the circuit shown in FIGS. 2*a* and 2*b* corresponding to the functional boxes of FIG. 1 are designated by the same reference character to facilitate reference between the figures.

Similarly, the connecting lines between the portions of the circuit are indicated with the same reference character as in FIG. 1 wherever possible.

The symbols used in FIGS. 2*a* and 2*b* represent conventional logical elements used in digital computing devices. The blocks identified with A represent AND gates in which all inputs must be high to provide an output which is also high. The AND gates do not invert; in other words, if all inputs are high the output is high and if one input is low the output is low.

The blocks identified with I are inverters. These are conventional circuits which merely serve to convert a high level to a low level and conversely.

Blocks identified as O are OR circuits. These elements provide an output which is high if any of the inputs are high.

Certain blocks are identified with a T. These are bistable elements such as triggers. While the system to be described utilizes triggers as bistable elements, it will be appreciated that other similar elements such as latches could also be used. It is possible that the use of other than triggers would require minor changes in the logic, but this would not constitute a departure from the invention.

The non-priority interrupt monitor 4 has a number of input lines 6 connected to various transducers on the process being monitored. As mentioned previously, such lines would normally be connected to limit switches, timing pulse generators and the like. Each of the interrupt lines 6 is connected to the input of a bi-stable device such as trigger 30 monitoring the sixth interrupt condition in the scanning sequence by means of line 31. Only a few triggers are shown to simplify the drawing. An interrupt signal on line 31, connected to the input of trigger 30, changes the state of this trigger from off to on. Since the input pulse applied to line 31 may be transient in nature, the trigger preserves an indication and thus provides a memory function. Having been turned on, trigger 30 presents a high level on output line 32. This conditions one input to AND gate 33. The other two inputs to AND gate 33, indicated as 34, are conditioned by the appropriate lines connected to ring circuit 15. In the case now being described these would be the units value of 6, and the tens value of 0. Assuming now that the ring 15 has reached the position of units 6, tens zero, AND gate 33 is conditioned to provide an output on line 35. This signal passes through OR circuit 36 to AND gate 37 on line 38. The other input to AND gate 37 is conditioned from inverter 39 which has an input 40 energized from the priority control 8. The derivation of the signal on line 40 will be discussed in greater detail later. It is sufficient at this time to know that the sigal on line 40 will be low when no priority interrupts exist. When no priority interrupts exist the output of inverter 39 on line 41 is high, thereby conditioning AND gate 37 to provide a signal on line 20. A signal appearing on line 20 indicates that the scanning ring has encountered an interrupt monitor in the on condition. This signal is applied to OR circuit 43 which in turn provides an input signal to scanning ring control 14 on line 44.

Scanning ring control 14 includes an AND gate 45 having one input energized by the signal on line 20 and an input 46 energized by a timing pulse T1. Thus, after the scanning ring encounters a interrupt monitor at the position units 6, tens zero, and a signal has been provided to the scanning ring control at time T1, the output of AND gate 45 on line 47 is applied to the Scanning Ring Run Trigger 48 in a manner to turn it off. The output of trigger 48 on line 49 is supplied to inverter 50. When the input to inverter 50 is low, as is the case when trigger 48 is off, the output of inverter 50 on line 21 is high, which indicates an interrupt request to the central processing unit 2. A signal on line 21 indicating an interrupt request serves to interrupt the operation of CPU2 as soon as the processing unit is able to handle the interrupt. This normally will be at the end of one instruction and prior to the initiation of another instruction step. AND gate 51, in FIG. 2*b*, has one input energized from line 21, another input line 52 energized with a signal from line 27 indicating that CPU2 is not already operating on an interrupt sub-routine, and a third input 53 which indicates that the computer is ready to accept an interrupt signal. This normally will be, as mentioned previously, at the end of an instruction. The inputs to AND gate 51 will vary with the type of central processing unit used with the interrupt control system. Therefore, these inputs are defined by their functional nature rather than the specific circuitry within CPU2 necessary to derive them.

Returning to FIG. 2*a*, the output 49 of trigger 48 is also connected to AND gate 54. When trigger 48 is in the off condition, the output 49 will be at the low level and AND gate 54 will not pass timing pulses applied to input 55 at T2 time. Normally, AND gate 54 will pass timing pulses applied on input 55 to cause scanning ring advance pulses to appear on line 19. These pulses pass to the scanning ring 15 on line 19 and cause it to step one position at a time. Therefore, when trigger 48 is turned off these pulses are no longer passed through AND gate 54 and the ring is held at the position corresponding to the interrupt monitor signalling an interrupt condition.

After the scanning ring has stopped at an interrupt monitor which is signalling an interrupt condition and the CPU2 has been informed, the monitor must be turned off. This prevents the interrupt control system from remaining locked on the same interrupt monitor. The monitor turn off signal is developed in the following manner.

Output 49 of trigger 48 energizes an input to inverter 56. The output 57 of inverter 56 serves as one input to AND gate 58. The other input 59 to AND gate 58 is supplied with a timing pulse at T2 time. This has the effect of producing an output signal on line 26 when the trigger 48 is in the off condition. A signal on line 26 provides one input to AND gate 60. The other input to AND gate 60 on line 61 comes from the output of AND gate 33. Thus, when the scanning ring 15 conditions AND gate 33 during an interrupt condition, the output on line 61 is combined with the timing pulse T2 and AND gate 60 to produce a pulse on line 62 which turns off only trigger 6. The interrupt monitor 6 is therefore returned to the initial condition after the ring 15 has been stopped at the position corresponding to the interrupt condition. This insures that each interrupt monitor will be serviced only once for each interrupt condition and subsequent scans of the ring will not find the monitor again in the on condition after having been serviced unless the interrupt signal on line 6 is again produced.

Ring 15 is a conventional stepping ring such as a shift register or other well known device. It has the characteristic of providing one energized line from the units position and one energized line from the tens position. The combination of these two signals represents one position. The position of the ring is signalled to the instruction address generator 24 on line 25.

Assuming that CPU2 has a 5 digit storage address, 5 positions are required as shown in the instruction address generator 24.

Within the instruction address generator 24 is a register having a units position 63, a tens position 64, a hundreds position 65, a thousands position 66 and a ten thousands position 67. The units and tens outputs of ring 15 are connected to the tens position 64 and hundreds position 65 respectively. The thousands position 66 and ten thousands position 67 will be set to a value compatible with the storage capability of CPU2. In normal operation of the interrupt control system the setting of thousands position 66 and ten thousands position 67 will not be altered, but will remain fixed for all positions of the ring 15. Similarly, the units position 63 will normally be set to zero.

This means that the instruction address generated by generator 24 will move 10 positions for each shaft of one position in ring 15. This allows space between adjacent locations in storage addressed by generator 14. The output of the instruction address generator 24 passes on line 23 to the instruction address register 68 within CPU2. Here again it will be appreciated that the instruction address register 68 may take many different forms, depending on the nature of operation of CPU2. For example, the instruction address register 68 could be the usual instruction address register containing the address of the next instruction, or in the alternative, it could be a duplicate of the instruction address register and control of the machine could be shifted from the usual instruction address generator to the alternate instruction address register.

It is immaterial to this invention whether the instruction address generator is of the type which generates sequential addresses or one in which an address is read into from memory. All that is required is that the output of instruction address generator 24 be placed into the instruction address register so that the next instruction for CPU2 will be taken from a location in storage dependent on the particular interrupt condition detected by scanning ring 15.

Normally, the address will provide the beginning of a subroutine program which will take corrective action for the interrupt condition which caused the signal initiating the interrupt program. After the address is placed in the instruction address register 68, the output of AND gate 51 on line 69 causes the computer to branch to the location indicated by the value of the number in instruction address register 68. This is accomplished by program means within CPU2. At the same time, the signal on line 69 serves to turn trigger 70 to the off condition, thereby guaranteeing that AND gate 51 will not be conditioned to accept another interrupt signal for the duration of the subroutine. The output of trigger 70 on line 71 serves as one input 52 of AND gate 51 which blocks other interrupt signals.

At the conclusion of an interrupt subroutine the last instruction of the subroutine will apply a reset signal to input 72 of trigger 70, thereby turning this trigger on. A high signal on line 71 provides a signal to the scanning ring control 14 on line 27. This signal turns on trigger 48 which again permits stepping pulses T3 to pass to the scanning ring 15 through AND gate 54. The ring then continues to interrogate the various triggers within the non-priority interrupt monitor 4 until another trigger is located which is in the on condition, or until the last position of the ring is scanned.

In the embodiment shown the scanning ring has 69 positions. Therefore, when the tens position reaches 6 and the units position reaches 9, the outputs 72 and 73 are high which serves to condition AND gate 74 to pass a T2 timing pulse applied to input 75. Thus, the output of AND gate 74 on line 22 serves to reset ring 15 through OR circuit 76 and scanning ring control 14. The output 16 of OR circuit 76 provides a ring reset signal and restores the ring to the units zero position, and the tens zero position after which a normal sequential scan is again executed.

Since in many applications of an interrupt control system it will be desirable to accord certain interrupt conditions special significance, the priority interrupt monitor 5 has a plurality of bistable circuits such as triggers, each having an input connected to one of lines 7 connected to the various process monitors. If an interrupt signal occurs which causes one of the monitors in the priority section 5 to be turned on, it is important the ring immediately begin a scan to determine which of the priority monitors is in the on condition. If the ring continued to scan in the non-priority area it might be some time before the priority interrupt would be serviced. This is an undesirable mode of operation and is avoided by the action of priority control circuit 8.

Assume that the priority monitor 5 has the highest priority position, which is monitored by trigger 76, indicating an interrupt condition in the process. Trigger 76 will be on in response to the priority interrupt signal applied to line 77 from the process. The output of trigger 76 on line 78 is connected to AND gate 79 and one of the inputs to this AND gate is thereby conditioned. The other two inputs 80 are conditioned by the scanning ring. However, it was noted earlier that the scanning ring may be at some other position at the time. Therefore, no output is produced on line 81 from AND gate 79 at this time. The output 78 of trigger 76 also passes via line 9 to priority control 8. Each of the conductors in line 9 passes to OR circuit 82 and priority control 8 so that any one of the priority monitors is able to begin priority action.

The output of OR 82 on line 83 will now provide a signal which operates to reset ring 15. The output 83 of OR 82 is connected to one input of AND gate 84. The other input 85 of AND gate 84 is conditioned by a pulse at T4 time. AND gate 84 will provide an output on line 86 at T4 time to priority condition trigger 87. A signal on line 86 has the effect of turning priority trigger 87 on which raises the level at output 88.

The output of priority trigger 87 on line 88 is connected to one input to AND gate 89. Another input 90 to AND gate 89 comes from inverter 91 which in turn is energized by the output of a 1.5 second single shot multivibrator 92. The functioning of this single shot multivibrator 92 will be explained in greater detail later. Single shot 92 will normally be on and the output on line 93 will normally be low. After passing through inverter 91 this output becomes high to condition input 90 to AND gate 89. Another input to AND gate 89 appears on line 94 which is energized by the output of inverter 95. Input line 96 to inverter 95 is energized by the output of AND gate 97 in scanning ring 15. AND gate 97 has an input 98 from the ten 0 position of ring 15 and another input 99 from OR circuit 100. An output appears on line 99 when one of the units outputs of ring 15 corresponds to a priority position. AND gate 97 operates to prevent the reset of the ring to initial position in the event that more than one priority trigger is in the on condition. The fourth input to AND gate 89 is a T4 timing pulse applied to line 101. At T4 time this pulse passes through a conditioned AND gate 89 to provide a signal on line 13 to OR circuit 76 which in turn develops a ring reset signal on line 16. Thus, if the ring is outside the priority position at the time a priority interrupt occurs, the ring is immediately reset to the first position and scanning is initiated from there.

The output of priority trigger 87 on line 88 appears also on line 10 connected to non-priority scanning control 11. This line is applied to input 40 of inverter 39. When line 10 is high, indicating that priority interrupt trigger 87 is on, the output 41 of inverter 39 is low. Therefore, AND gate 37 is blocked and non-priority interrupt signals on line 38 are not permitted to pass through AND gate 37 to provide an output on line 20.

After resetting to zero, the scanning of the priority positions occurs in the same manner as the high order positions. That is, AND gate 79 would be conditioned when the units 1 and the tens 0 position of ring 15 are reached. This allows the output signal from trigger 76 on line 78 to pass through AND gate 79 and appear as an output on line 81. This signal then passes through OR circuit 102 to produce an output signal on line 20 which is then treated in essentially the same manner as the output signal on line 20 from the non-priority scanning control 11.

The priority control 8 will return the system to the non-priority condition when none of the priority interrupt monitors are on. The output of OR circuit 82 on line 83 will be low providing a high output from inverter 103 on line 104. This conditions AND gate 105 to pass a T4 pulse to the input 106 of priority trigger 87. This signal turns off priority trigger 87 and scanning ring 15 is thereby permitted to conduct a full scan.

Under certain conditions there may be an unusual number of priority interrupt conditions. These could possibly occur in a sequence such that at least one priority monitor is on at all times. When this occurs, and the scanning ring ignores the other, non-priority, positions, it is desirable to suppress the priority signal as a temporary measure. It was mentioned earlier that single shot multivibrator 92 is normally on. This is true as long as the ring 15 completes a scan of all positions within the period of single shot 92. If the ring 15 reaches position 69 within the period of single shot 92, the output of AND 74 on line 22 resets single shot 92 to begin a new 1.5 second period.

Should the ring 15 fail to produce the reset pulse on line 22 within this time, single shot 92 will turn off and the output on line 93 will be high. The output line 93 is connected to the off side of single shot 92 to produce a high output level when in the off condition.

When line 93 is high, the output of inverter 91 on line 90 is low. This blocks passage of a signal through AND gate 89. No reset of ring 15 can then be accomplished even if a priority condition is indicated by priority trigger 87. AND gate 89 remains blocked until scanning ring 15 reaches the tens 6 units 9 position to produce a reset signal for single shot 92 from AND gate 74.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In an interrupt control system for use with a computer having an internally stored program, auxiliary control means for signalling an interrupt to said computer in response to an external event comprising:
   - means for monitoring a plurality of interrupt conditions,
   - counter means for sequentially scanning said monitoring means,
   - control means for holding said counter means at a position indicating an interrupt condition,
   - multiposition register means for indicating the position of said counter means to said computer,
   - means for transferring the position of said counter means into predetermined positions of said register while holding all other positions of said register unchanged at predetermined values for all values of said counter means,
   - priority means for resetting said counter means to the initial position in response to an interrupt condition indicated by selected of said monitoring means,
   - timing means responsive to said resetting means for establishing an interval beginning with a reset of said counter means,
   - means responsive to the last position of said counter means for resetting said timing means, and
   - means responsive to said timing means whereby said reset is suppressed when said counter means fails to complete a scan of said monitoring means within said interval.

2. In an interrupt control system for use with a computer having an internally stored program, means for signalling an interrupt to said computer in response to an external event comprising:
   - means for monitoring a plurality of interrupt conditions,
   - counter means for sequentially scanning said monitoring means,
   - control means for holding said counter means at a position indicating an interrupt condition,
   - multiposition register means for indicating the position of said counter means to said computer,
   - means for transferring the position of said counter means into predetermined positions of said register while holding all other positions of said register unchanged at predetermined values for all values of said counter means, priority control means responsive to a selected group of said monitoring means for establishing a priority condition, means for resetting said counter means to the initial position upon completion of a scan of all positions and upon the occurrence of a priority condition, timing means responsive to said resetting means for establishing an interval beginning with the complete scan of all of said monitoring means, and means responsive to said timing means for suppressing the opertaion of said reset means in response to the occurrence of a priority condition when said counter means fails to complete another scan of all said monitoring means within the interval defined by said timing means.

3. In an interrupt control system for use with a computer having an internally stored program, auxiliary control means for signalling an interrupt to said computer in response to an external event comprising:

means for monitoring a plurality of interrupt conditions, counter means for sequentially scanning said monitoring means, control means for holding said counter means at a position indicating an interrupt condition, multiposition register means for indicating the position of said counter means to said computer, means for transferring the position of said counter means into predetermined positions of said register while holding all other positions of said register unchanged at predetermined values for all values of said counter means, priority reset means for setting said counter means to a predetermined position in response to said priority control means, timing means responsive to said counter means for establishing an interval beginning with the scan of the last of said monitoring means, and reset suppress means responsive to said timing means whereby said priority reset means is suppressed when said counter means fails to complete a scan of all said monitoring means within said interval.

References Cited by the Examiner

UNITED STATES PATENTS

| | | | |
|---|---|---|---|
| 2,951,234 | 8/1960 | Speilberg et al. | 340—172.5 |
| 3,029,414 | 4/1962 | Schrimpf | 340—172.5 |
| 3,048,332 | 8/1962 | Brooks et al. | 340—172.5 |
| 3,061,192 | 10/1962 | Terzian | 235—157 |
| 3,063,036 | 11/1962 | Reach et al. | 340—172.5 |
| 3,079,082 | 2/1963 | Scholten et al. | 340—172.5 |

ROBERT C. BAILEY, *Primary Examiner.*

DARYL W. COOK, *Examiner.*

I. KAVRUKOV, *Assistant Examiner.*